(12) United States Patent
Sakata et al.

(10) Patent No.: US 8,347,697 B2
(45) Date of Patent: Jan. 8, 2013

(54) SURFACE TEXTURE MEASURING DEVICE

(75) Inventors: Yukihiro Sakata, Kanagawa (JP);
Hiroomi Honda, Miyazaki (JP);
Hiroyuki Hidaka, Miyazaki (JP)

(73) Assignee: Mitutoyo Corporation, Kawasaki (JP)

( * ) Notice: Subject to any disclaimer, the term of this patent is extended or adjusted under 35 U.S.C. 154(b) by 79 days.

(21) Appl. No.: 13/025,508

(22) Filed: Feb. 11, 2011

(65) Prior Publication Data

US 2011/0197665 A1    Aug. 18, 2011

(30) Foreign Application Priority Data

Feb. 16, 2010    (JP) .................... 2010-031116

(51) Int. Cl.
*G01B 5/28*    (2006.01)
(52) U.S. Cl. ........................................... 73/105
(58) Field of Classification Search ............... None
See application file for complete search history.

(56) References Cited

FOREIGN PATENT DOCUMENTS

| EP | 1079201 A2 | 2/2001 |
|---|---|---|
| EP | 1959225 A1 | 8/2008 |
| EP | 1998137 A2 | 12/2008 |
| JP | 4-24408 | 6/1992 |
| JP | 5-269649 A | 10/1993 |

*Primary Examiner* — Robert R Raevis
(74) *Attorney, Agent, or Firm* — Rankin, Hill & Clark LLP

(57) ABSTRACT

A surface texture measuring device includes a threshold value storage module configured to store a threshold input through an operation key, a stylus move distance detector configured to detect a move distance in the trace direction of the stylus, a cumulative move distance storage module configured to cumulatively store the move distance of the stylus detected by the stylus move distance detector; and. a notification module (controller) configured to make a comparison between the threshold value stored in the threshold value storage module and the cumulative move distance stored in the cumulative move distance storage module and notifying a user of replacement of the stylus when the cumulative move distance has exceeded the threshold value.

6 Claims, 8 Drawing Sheets

FIG. 4A
FIG. 4B
FIG. 4C
| MATERIAL | THRESHOLD VALUE |
|---|---|
| ALUMINUM | L1m |
| STAINLESS STEEL | L2m |
| IRON | L3m |
| CAST IRON | L4m |
| RESIN | L5m |
| GLASS | L6m |
| ⋮ | ⋮ |

SURFACE TEXTURE MEASURING DEVICE

CROSS REFERENCE TO RELATED APPLICATION(S)

This application is based upon and claims the benefit of priority from Japanese Patent Application No. 2010-031116 filed on Feb. 16, 2010, the entire contents of which are incorporated herein by reference.

BACKGROUND

1. Field

The present disclosure relates to a surface texture measuring device. More particularly, the present disclosure relates to a surface texture measuring device that can inform the user of the replacement timing of a stylus.

2. Description of the Related Art

A surface texture measuring device for measuring the surface texture such as the surface roughness, the surface shape of a measured substance is known (for example. Patent Document 1, etc.).

A stylus is brought into contact with the surface of a measured substance and is traced along the surface of the measured substance in the contacted state. The stylus displaces in a direction crossing (orthogonal to) the trace direction in response to the surface texture of the measured substance. Thus, the surface texture of the measured substance can be measured from the displacement amount of the stylus.

[Patent Documents]

[Patent Document 1] Japanese Utility Model Publication No. Hei. 4-24408 (Y2)

Generally, in the surface texture measuring device, the stylus traces along the surface of a measured substance in a state in which the stylus is in contact with the surface of the measured substance. Thus, the tip of the stylus easily wears. If measurement is conducted as the tip of the stylus wears, the surface texture, above all, surface roughness cannot precisely be measured.

Then, it is considered that the stylus is replaced based on the number of measurements or the number of elapsed days since the calibration day. However, for the number of measurements, the time of measurement extremely varies depending on the difference in measurement conditions. Thus, if the number of measurements is the same, the wear amount of the stylus varies. For the number of elapsed days since the calibration day, namely, for periodic inspection, the number of measurements also varies and thus the wear degree of the stylus also varies. Therefore, it is not easy to replace the stylus at an appropriate timing.

SUMMARY

Exemplary embodiments of the present invention provide a surface texture measuring device that can properly inform the user of the replacement timing of a stylus.

A surface texture measuring device according to an exemplary embodiment, comprises:

a drive module configured to drive a stylus so that the stylus is traced along a surface of a measured substance in a state that the stylus is brought into contact with the surface of the measured substance;

a stylus displacement detector configured to detect displacement of the stylus in a direction crossing a trace direction;

a measurement module configured to measure surface texture of the measured substance based on the displacement amount of the stylus a threshold value storage module configured to store a threshold;

a stylus move distance detector configured to detect a move distance in the trace direction of the stylus;

a cumulative move distance storage module configured to cumulatively store the move distance of the stylus detected by the stylus move distance detector; and a notification module configured to make a comparison between the threshold value stored in the threshold value storage module and the cumulative move distance stored in the cumulative move distance storage module and to notify a user of replacement of the stylus when the cumulative move distance has exceeded the threshold value.

The surface texture measuring device may further comprise an input module, and the threshold value storage module may be configured to store the threshold value input through the input module.

According to such a configuration, a comparison is made between the threshold value stored in the threshold value storage module and the cumulative move distance stored in the cumulative move distance storage module and when the cumulative move distance has exceeded the threshold value, the user is notified of replacement of the stylus, so that the user can be properly informed of the replacement timing of the stylus.

That is, the cumulative move distance of the stylus in a state in which the stylus is in contact with the surface of the measured substance is proportional to the wear amount of the stylus. Thus if the user is notified of the replacement timing based on the cumulative move distance, the user can be properly informed of the replacement timing of the stylus.

The term "notification" is used to mean display of a message and an icon for prompting the user to replace the stylus, and in addition, a method of informing the user of replacement of the stylus by sounding a beeper, a method of lighting or blinking a stylus replacement lamp, or the like.

The surface texture measuring device may further comprise:

a material threshold value storage module configured to store threshold values corresponding to different materials of measured substances; and a threshold value write module configured to read the threshold value corresponding to the material input through the input module from the material threshold value storage module and to set the read threshold value in the threshold value storage module.

Generally, the wear degree of the stylus also varies depending on the material difference of a measured substance.

In the exemplary embodiment, the threshold values corresponding to different materials of measured substances are previously stored in the material threshold value storage module. Thus, when the material of the measured substance is input through the input module, the threshold value corresponding to the input material is read from the material threshold value storage module and is set in the threshold value storage module. Therefore, the optimum threshold value can be set simply by inputting the material of the measured substance without selecting and inputting the optimum threshold value for each material of the measured substance by a measurement person.

The surface texture measuring device may further comprise:

a display module configured to display the measurement result of the surface texture of the measured substance, wherein the notification module is configured to make a comparison between the threshold value stored in the threshold value storage module and the cumulative move distance stored in the cumulative move distance storage module and to display replacement notification information of notifying the user of replacement of the stylus on the display module when the cumulative move distance has exceeded the threshold value.

According to such a configuration, a comparison is made between the threshold value stored in the threshold value storage module and the cumulative move distance stored in the cumulative move distance storage module and when the cumulative move distance has exceeded the threshold value, the user is informed of replacement of the stylus on the display module. Thus the measurement person can see display on the display module and can be informed of replacement of the stylus.

BRIEF DESCRIPTION OF THE DRAWINGS

FIGS. 4A to 4C are exemplary views for explaining a storage in the embodiment;

DETAILED DESCRIPTION

A surface texture measuring device according to one embodiment of the invention will be discussed based on the accompanying drawings.
<Configuration of Surface Texture Measuring Device>

Figure 1:
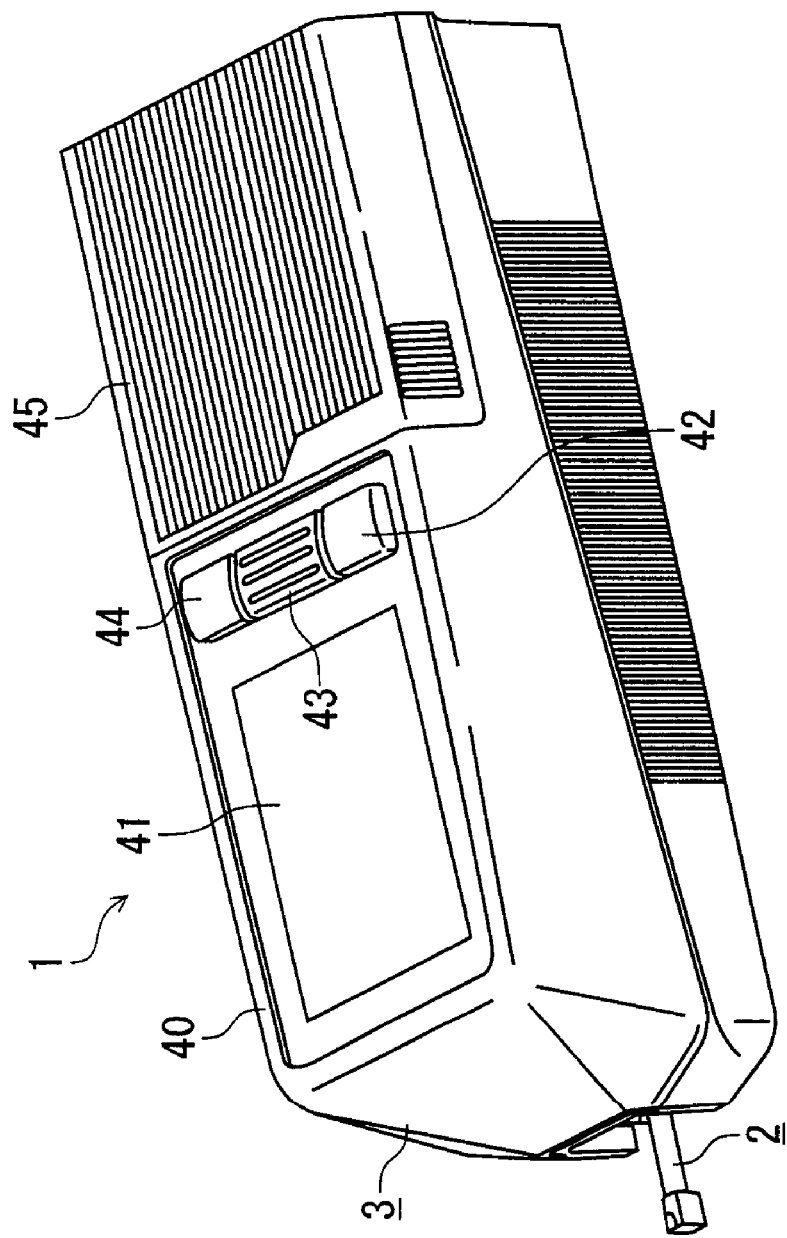
FIG. 1 is an exemplary perspective view showing a surface texture measuring device according to an embodiment.
Figure 2:
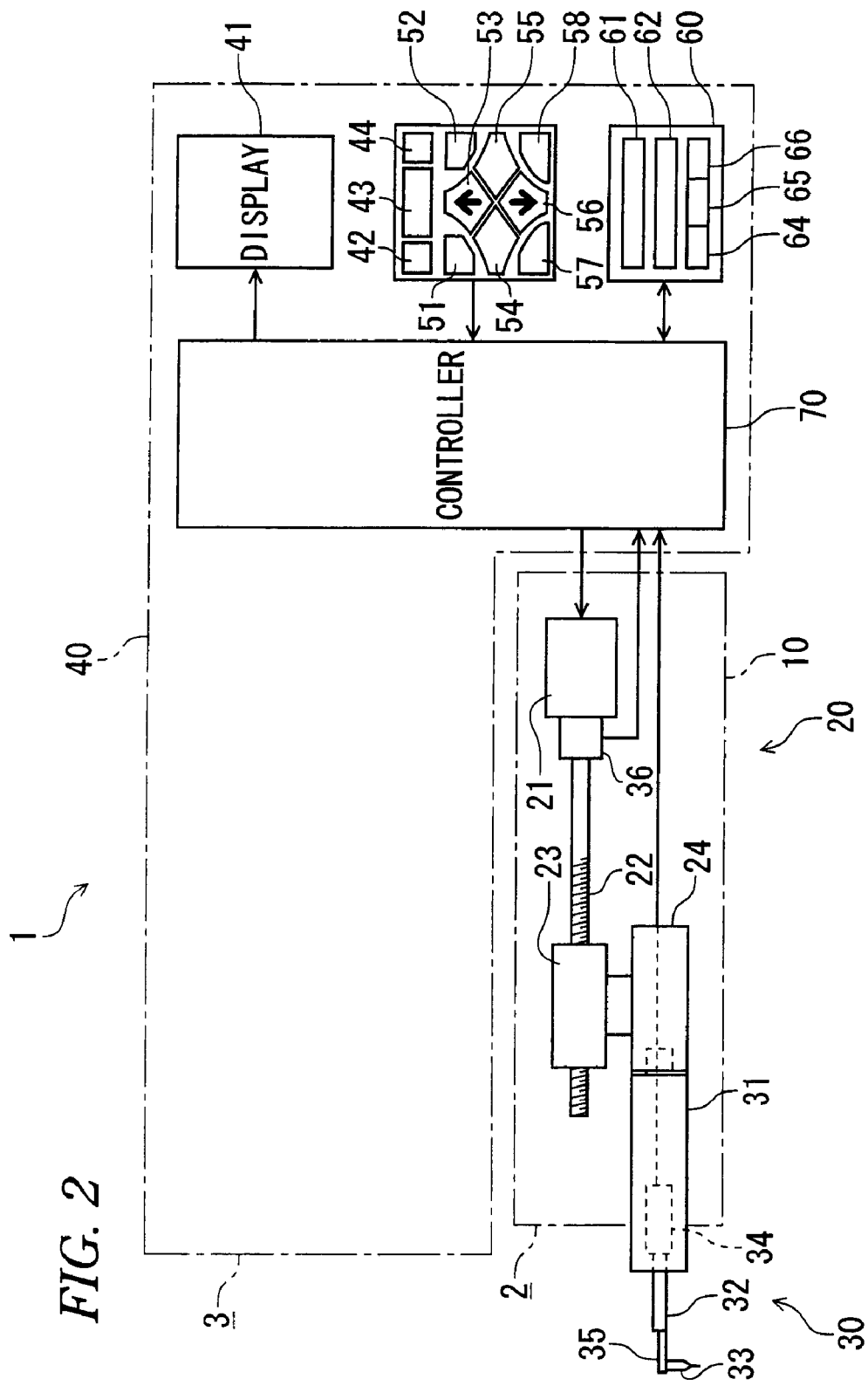
FIG. 2 is an exemplary schematic view showing an internal mechanism of the surface texture measuring device according to the embodiment.

FIG. 1 is a perspective view to show the appearance of a surface texture measuring device of handy type, and FIG. 2 is a drawing to show the internal mechanism of the measuring device. As shown in the figures, a surface texture measuring device 1 of the embodiment is roughly made up of a drive detection section 2 and a computation display section 3 that can house the drive detection section 2.

As shown in detail in FIG. 2, the drive detection section 2 is made up of a detection section case 10, a drive module 20 provided in the detection section case 10, and a detector 30 moved linearly along a measurement direction by the drive module 20.

The drive module 20 is made up of a motor 21 as a drive source fixed to the detection section case 10, a feed screw shaft 22 joined to the motor 21 and placed in parallel along a move direction of the detector 30 in the detection section case 10, a nut member 23 screwed to the feed screw shaft 22, and a hold member 24 jointed to the nut member 23 for detachably holding the detector 30.

The detector 30 includes a detector main body 31 detachably held in the hold member 24 of the drive module 20, a stylus arm 32 swingably supported at the tip of the detector main body 31, a stylus chip 35 having a stylus 33 projected at the right angle to the axis of the stylus arm 32 and being detachably attached to the tip of the stylus arm 32, and a detection element 34 for detecting the swing amount of the base end of the stylus arm 32 in the detector main body 31 as a stylus displacement detector.

When the stylus 33 moves along the surface of a measured substance, the stylus 33 moves up and down according to the surface texture of the measured substance, in this embodiment, surface roughness. Then, the move up and down of the stylus 33 are detected as a detection signal by the detection element 34. The surface roughness of the measured substance is measured from the detection signal accompanying the move up and down and a move distance in the trace direction of the stylus 33 (distance in the left-right direction in FIG. 2).

The move distance in the trace direction of the stylus 33 is detected by a stylus move distance detector 36. The stylus move distance detector 36 can detect the move distance in the trace direction of the stylus 33 from the rotation amount of the feed screw shaft 22 in the drive module 20, for example.

Figure 3:
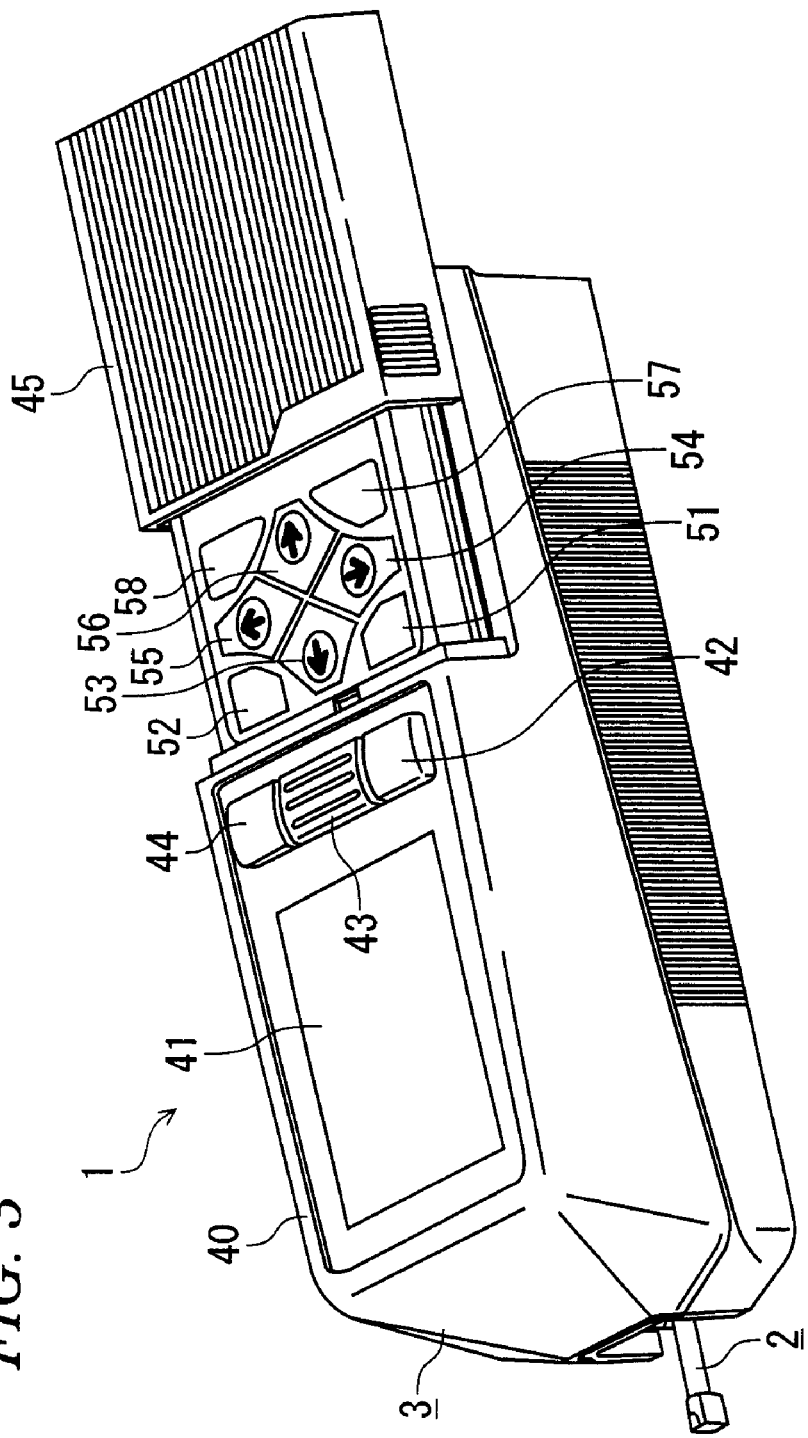
FIG. 3 is an exemplary perspective view showing a state that a cover of a computation display section is slid in the surface texture measuring device according to an embodiment.

The computation display section 3 has a housing case 40 of a size that can house the drive detection section 2 from above as shown in FIG. 3.

The housing case 40 is shaped like a rectangular parallelepiped of a size whose width dimension can be grasped with a single hand and has a lower face opened for housing the drive detection section 2. A liquid crystal display 41 as a display module and main operation keys of a power key 42, a measurement start key 43, a page key 44, etc., are arranged on the front half side of the upper face of the housing case 40 and a cover 45 is placed on the back half side so that it can be slid back and forth.

Auxiliary operation keys as a input module having four cross-shaped operation keys 53 to 56 and four operation keys 51, 52, 57, and 58 at four corners are placed just below the cover 45. Functions of setting a measurement condition, giving a command of display switch of measurement result, and the like are assigned to the operation keys 51 to 58.

The housing case 40 contains storage 60 and a controller 70 connected to the storage 60, the power key 42, the measurement start key 43, the page key 44, the operation keys 51 to 58, the display 41, and the drive detection section 2, as shown in FIG. 2.

The storage 60 is provided with a measurement condition storage module 61 storing a measurement condition, a measurement result storage module 62 for storing the measurement result, etc., a threshold value storage module 64, a cumulative move distance storage module 65, a material threshold value storage module 66, etc.

The threshold value storage module 64 stores a threshold value as a criterion value for determining whether or not the cumulative move distance of the stylus 33 reaches a stylus replacement distance, as shown in FIG. 4A.

The cumulative move distance storage module 65 stores the cumulative move distance of the move distances detected by the stylus move distance detector 36, as shown in FIG. 4B.

The material threshold value storage module 66 stores optimum threshold values (L1, L2, L3 . . . ) corresponding to different materials of measured substances (for example, aluminum, stainless steel, iron . . . ), as shown in FIG. 4B.

When the measurement start key 43 is operated, the controller 70 drives the drive module 20 in accordance with a preset measurement condition and performs processing of reading a detection signal from the detector 30 moved by the drive module 20 as a surface texture measurement signal and storing the signal in the measurement result storage module 62.

The controller 70 also serves as a threshold value write module. When a threshold value is input with the operation keys 51 to 58 as an input module, the threshold value write module writes the input threshold value to the threshold value storage module 64, and when the material of a measured substance is input with the operation keys 51 to 58, the threshold value write module reads the threshold value corresponding to the input material from the material threshold value storage module 66 and writing the threshold value to the threshold value storage module 64.

Further, the controller 70 also serves as a notification module for making a comparison between the threshold value stored in the threshold value storage module 64 and the cumulative move distance stored in the cumulative move distance storage module 65 and when the cumulative move distance exceeds the threshold value, notifying the user of replacement of the stylus 33, specifically, displaying replacement notifying information of notifying the user of replacement of the stylus 33 on the display 41.

<Operation and Effect of Surface Texture Measuring Device>

For measurement, first a threshold value for stylus replacement is set.

Figure 5:
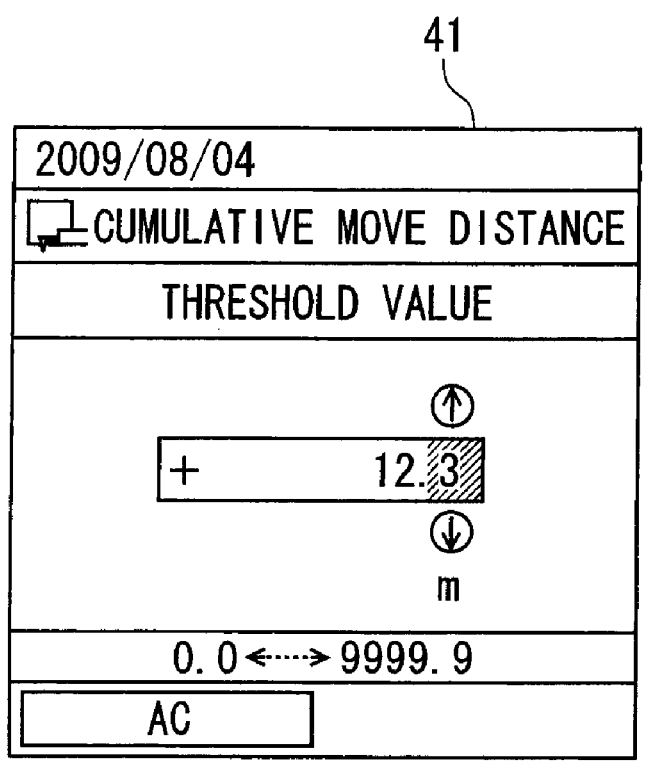
FIG. 5 is an exemplary view showing a threshold value setting screen in the embodiment.

To do this, for example, the user sets the threshold value to any desired value by operating the operation keys 55 and 58 in a state in which a threshold value setting screen shown in FIG. 5 is displayed. Then, the setup threshold value is stored in the threshold value storage module 64.

Figure 6:
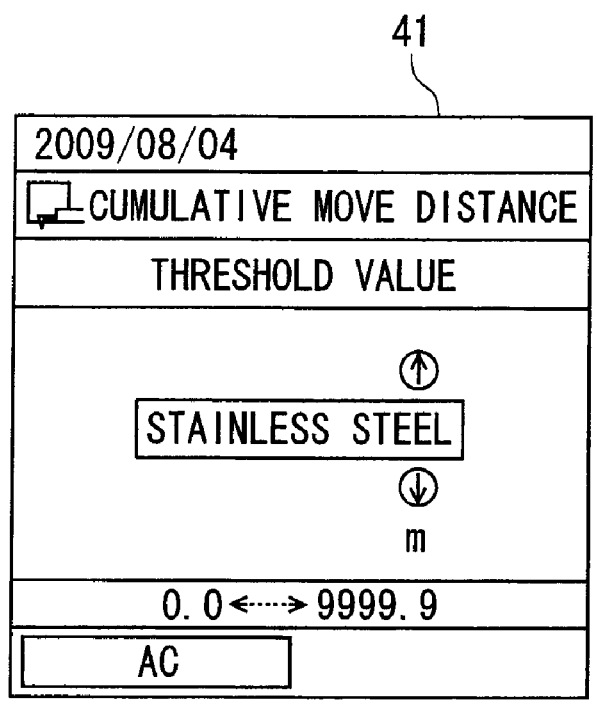
FIG. 6 is an exemplary view showing another threshold value setting screen in the embodiment.

Alternatively, the user selects the material of a measured substance by operating the operation keys 55 and 58 in a state in which a threshold value setting screen shown in FIG. 6 is displayed. Then, the threshold value corresponding to the selected material is read from the material threshold value storage module 66 and is set in the threshold value storage module 64.

Thus, the threshold value is set in the threshold value storage module 64 and then when the measurement start key 43 is pressed in a state in which the stylus 33 is brought into contact with the surface of the measured substance, the controller 70 drives the drive module 20. When the drive module 20 is driven, the stylus 33 moves as it is contact with the surface of the measured substance and thus the stylus 33 is displaced in response to the surface texture of the measured substance. Then, a surface texture signal of the stylus 33 detected by the detection element 34 and a stylus move distance signal detected by the stylus move distance detector 36 are read to the controller 70 and are stored in the measurement result storage module 62 and the stylus move distance signal is cumulatively stored in the cumulative move distance storage module 65.

Upon completion of the measurement, the controller 70 performs computation processing of the read stylus move distance signal and the read surface texture signal and displays the computation result on the display 41.

Figure 7:
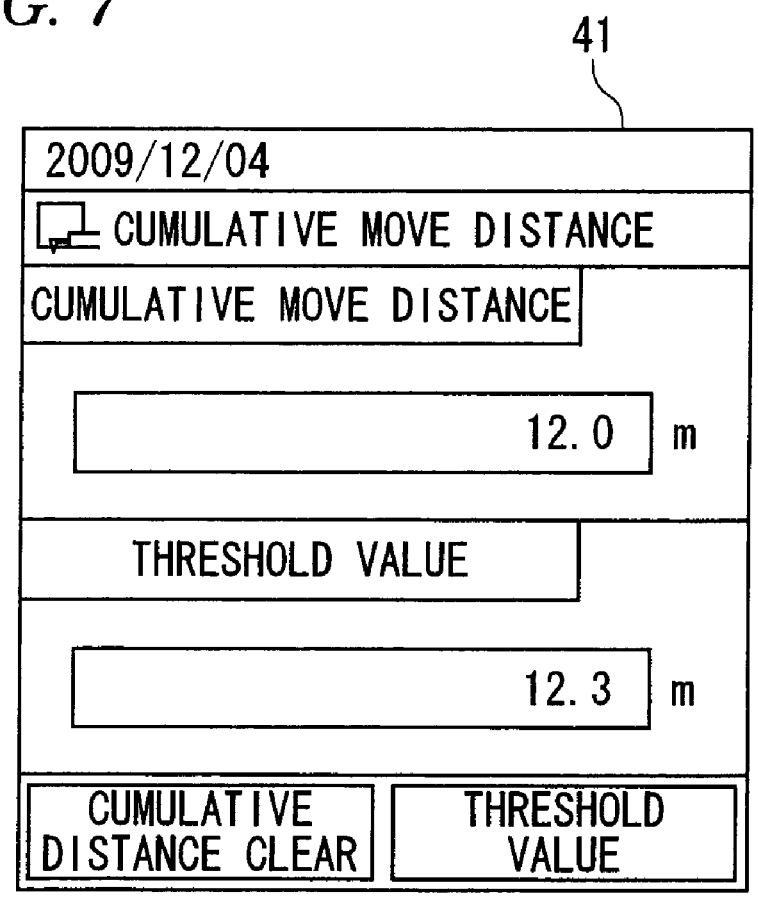
FIG. 7 is an exemplary view showing a screen displaying a cumulative move distance and a threshold value.

When a screen of the display 41 is switched to a stylus alarm screen at any time, the cumulative move distance stored in the cumulative move distance storage module 65 and the threshold value stored in the threshold value storage module 64 are displayed as shown in FIG. 7. Therefore, whether or not the cumulative move distance reaches the threshold value can be checked from the display.

Figure 8:
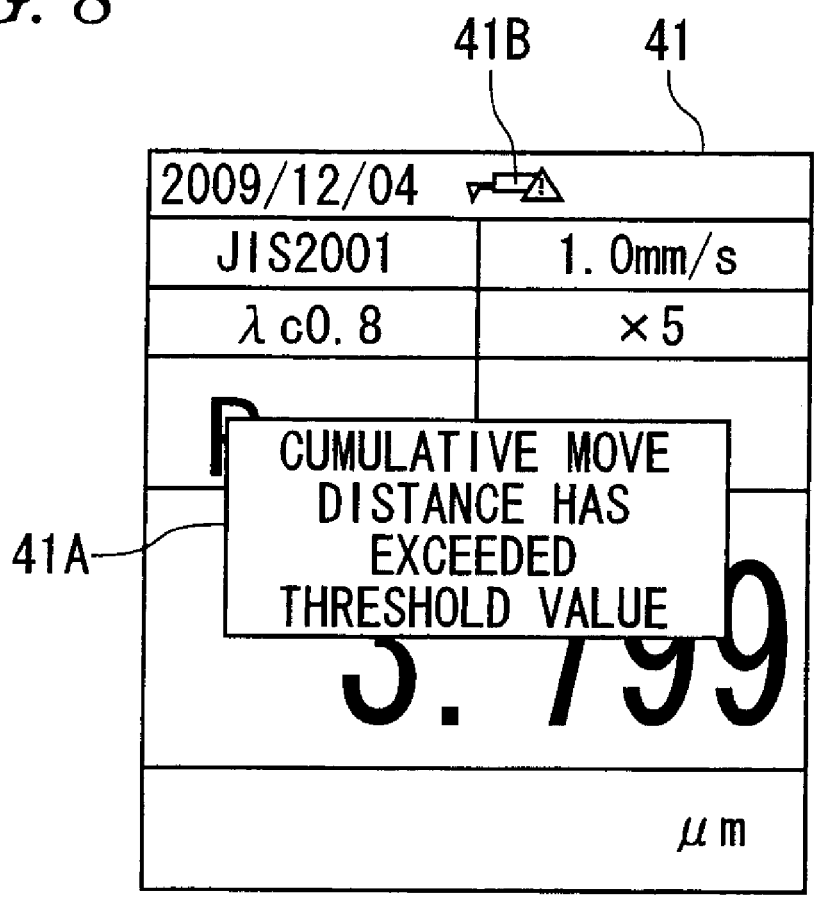
FIG. 8 is an exemplary view showing a screen in a state that the cumulative move distance exceeds the threshold value.

When the cumulative move distance exceeds the threshold value in the process of the measurement, the user is informed of replacement of the stylus 33. That is, as shown in FIG. 8, a status alarm message to the effect that the cumulative move distance has exceeded the threshold value, in this embodiment, a status alarm message 41A of "cumulative move distance has exceeded threshold value" is displayed and a status alarm icon 41B for notifying the user of replacement of the stylus 33 is displayed. The status alarm message 41A of "cumulative move distance has exceeded threshold value" automatically disappears in several seconds, but the status alarm icon 41B remains displayed in a status bar.

Therefore, the measurement person sees the display and can acknowledge that the replacement timing of the stylus 33 has come and thus replaces the stylus 33. This means that the stylus chip 35 having the stylus 33 is replaced with respect to the status alarm 32.

After the stylus 33 is replaced, if the cumulative move distance (cumulative move distance storage module 65) is cleared, the stylus alarm icon 41B disappears.

Therefore, according to the embodiment, a comparison is made between the threshold value stored in the threshold value storage module 64 and the cumulative move distance stored in the cumulative move distance storage module 65 and when the cumulative move distance has exceeded the threshold value, the user is notified of replacement of the stylus 33, so that the user can be properly informed of the replacement timing of the stylus 33.

Since the threshold values corresponding to different materials of measured substances are previously stored in the material threshold value storage module 66, when the material of the measured substance is input with the operation keys 51 to 58, etc., the threshold value corresponding to the input material is read from the material threshold value storage module 66 and is set in the threshold value storage module 64. Therefore, the optimum threshold value can be set simply by inputting the material of the measured substance without inputting the optimum threshold value for each material of the measured substance.

<Modified Examples>

The invention is not limited to the embodiment described above and contains modifications, improvements, etc., in the range in which the object of the invention can be accomplished.

In the embodiment described above, when the cumulative move distance has exceeded the threshold value, the stylus alarm message 41A and the stylus alarm icon 41B for prompting the user to replace the stylus 33 are displayed on the display, but the invention is not limited to the mode.

For example, a method of informing the user of replacement of the stylus 33 by sounding a beeper, a method of lighting or blinking a stylus replacement lamp, or the like may be adopted.

In the embodiment described above, the signal from the stylus move distance detector 36 is read and the move distance of the stylus 33 is cumulatively stored provided that the measurement start key 43 is pressed. However, if the signal from the stylus move distance detector 36 is read and the move distance of the stylus 33 is cumulatively stored provided that the surface texture signal of the stylus 33 detected by the detection element 34 is input (namely, the stylus 33 is in contact with the measured substance) in addition to pressing of the measurement start key 43, the wear amount of the stylus 33 can be detected more precisely.

The drive module 20 is made up of the motor 21, the feed screw shaft 22, the nut member 23, and the hold member 24, but the invention is not limited to it. Air or hydraulic cylinder may be used as a drive source and the detector may be moved linearly by the cylinder.

The invention can be used for a surface texture measuring device, etc., such as a roughness measuring device or a shape measuring device.

What is claimed is:

1. A surface texture measuring device comprising:
    a drive module configured to drive a stylus so that the stylus is traced along a surface of a measured substance in a state that the stylus is brought into contact with the surface of the measured substance;
    a stylus displacement detector configured to detect displacement of the stylus in a direction crossing a trace direction;
    a measurement module configured to measure surface texture of the measured substance based on the displacement amount of the stylus
    a threshold value storage module configured to store a threshold;
    a stylus move distance detector configured to detect a move distance in the trace direction of the stylus;
    a cumulative move distance storage module configured to cumulatively store the move distance of the stylus detected by the stylus move distance detector; and
    a notification module configured to make a comparison between the threshold value stored in the threshold value storage module and the cumulative move distance stored in the cumulative move distance storage module and to notify a user of replacement of the stylus when the cumulative move distance has exceeded the threshold value.

2. The surface texture measuring device as claimed in claim 1 further comprising:
    an input module,
    wherein the threshold value storage module is configured to store the threshold value input through the input module.

3. The surface texture measuring device as claimed in claim 2 further comprising:
    a material threshold value storage module configured to store threshold values corresponding to different materials of measured substances; and
    a threshold value write module configured to read the threshold value corresponding to the material input through the input module from the material threshold value storage module and to set the read threshold value in the threshold value storage module.

4. The surface texture measuring device as claimed in claim 3 further comprising:
    a display module, said display module being configured to display the measurement result of the surface texture of the measured substance and to display replacement notification information,
    wherein the notification module is configured to make a comparison between the threshold value stored in the threshold value storage module and the cumulative move distance stored in the cumulative move distance storage module and to display replacement notification information of to notify the user of replacement of the stylus on the display module when the cumulative move distance has exceeded the threshold value.

5. The surface texture measuring device as claimed in claim 2 further comprising:
    a display module, said display module being configured to display the measurement result of the surface texture of the measured substance and to display replacement notification information,
    wherein the notification module is configured to make a comparison between the threshold value stored in the threshold value storage module and the cumulative move distance stored in the cumulative move distance storage module and to display replacement notification information of to notify the user of replacement of the stylus on the display module when the cumulative move distance has exceeded the threshold value.

6. The surface texture measuring device as claimed in claim 1 further comprising:
    a display module, said display module being configured to display the measurement result of the surface texture of the measured substance and to display replacement notification information,
    wherein the notification module is configured to make a comparison between the threshold value stored in the threshold value storage module and the cumulative move distance stored in the cumulative move distance storage module and to display replacement notification information to notify the user of replacement of the stylus on the display module when the cumulative move distance has exceeded the threshold value.

* * * * *